July 10, 1951  T. A. RICH  2,560,247
SPARK RECORDER APPARATUS
Filed July 29, 1949
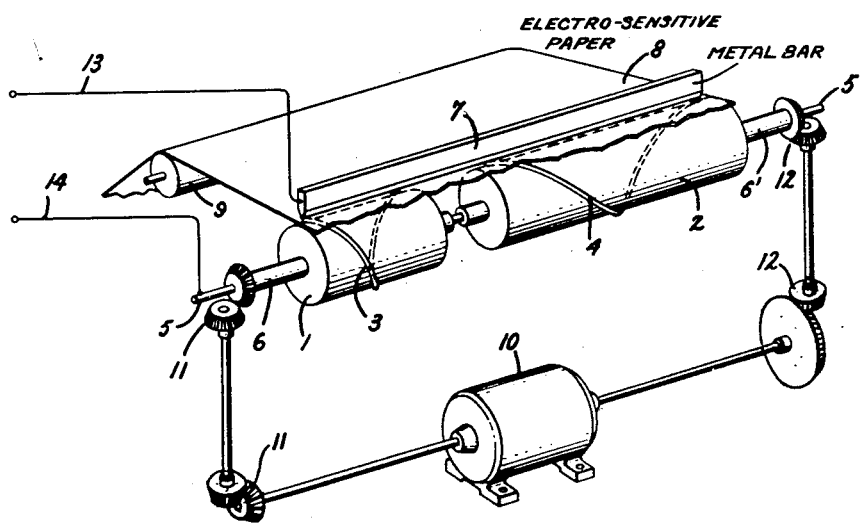
Inventor:
Theodore A. Rich,
by Richard E. Hosley
His Attorney.

Patented July 10, 1951

2,560,247

UNITED STATES PATENT OFFICE 2,560,247

SPARK RECORDER APPARATUS

Theodore A. Rich, Schenectady, N. Y., assignor to General Electric Company, a corporation of New York Application July 29, 1949, Serial No. 107,607

3 Claims. (Cl. 346—74)

My invention relates to recording devices and more particularly to devices for instantaneously recording time intervals, or electrical potentials as a function of time, by the use of an electrical spark as the recording medium.

In many applications of recording devices, such as in the radio sonde where temperature, pressure, wind velocity and direction can be accurately converted into a representative electrical potential, it is highly desirable that the recording of this electrical potential be accomplished with equal accuracy. However, many difficulties are encountered in providing a simple and economical recorder which is precise enough to be suitable.

One of the conventional recording methods has been to produce a spark from a rotating helical conductor to a stationary printing bar. The spark passes through an electro-sensitive material and leaves a mark thereon, and the position of the helix at the time that the spark is produced determines the point at which the spark passes through the paper. The rotation of the helix is synchronized to the spark producing means so that one spark occurs during each revolution, and by varying the sparking time interval in response to changes in the parameters to be measured, a continuous record of these variations is obtained.

The accuracy of such spark recorders, however, has suffered from the tendency of the spark to wander slightly from the straight line path between the energizing electrodes with the result that a relatively coarse and irregular trace is produced. In order to reduce the percentage of error introduced by such spark wandering, the recording equipment must be extremely sensitive so that a wide deviation of the position of the spark is produced with a small change in the amplitude of the measured signal. Such high sensitivity is attainable by rotating the helix at a sufficiently high speed so that a large change in the angular position of the helix occurs during a relatively short time interval. The range of signal deviation which may be employed with such high speed recorders is usually quite limited, however, since a comparatively small signal deviation causes the recorder to reach full scale deflection. On the other hand, if the speed of rotation is reduced in order to provide a greater range, the sensitivity, and consequently the accuracy, of the recorder is correspondingly lessened, and this loss of sensitivity can only be compensated by increasing the physical size of the helix. As a result, it has been necessary to employ large and cumbersome equipment using wide sheets of electro-sensitive paper in order to provide an accurate and wide range spark recorder.

A principal object of my invention, therefore, is to provide a simple, compact and economical spark recorder which has high sensitivity and which, in addition, can cover a wide range of variation in the signal to be recorded.

A more specific object of my invention is to provide means whereby the range of a spark recorder can be expanded to give both a coarse and fine reading of the magnitude of an applied signal.

In general my invention comprises a pair of rotating helical conductors or helixes arranged in a spark recorder to produce simultaneous sparks through a moving electro-sensitive material, such as electrically sensitive paper, in response to electrical impulses which are to be measured. One of the helixes is rotated at a much faster angular velocity than the other helix so that two traces are delineated on the paper. Since the position of each spark is a function of the angular position of the associated helical conductor at the instant the spark is produced, one of the traces, corresponding to the more slowly rotating helix, provides a coarse reading of the time of spark occurrence by indicating the number of revolutions made by the higher speed helix, while the other trace provides a fine highly accurate reading by indicating the angular position of the higher speed helix within that particular revolution.

The novel features which I believe to be characteristic of my invention are set forth with particularity in the appended claims. My invention itself, however, together with further objects and advantages thereof can best be understood by reference to the following description taken in connection with the accompanying drawing in which the sole figure is a perspective view of a spark recorder embodying my invention.

Referring to the drawing, I have shown my invention in one form as comprising a small cylinder or drum 1 longitudinally spaced from an axially longer cylinder or drum 2 whose diameter is equal to that of drum 1. One turn of a helical conductor or helix 3 is wound in a conventional manner along the length of the smaller cylinder 1 and a similar longer one turn helical conductor helix 4 encircles the longer cylinder 2 as illustrated. Both cylinders are preferably journalled on a common shaft 5 but are arranged as a free fit thereon by virtue of a pair of bearing members, such as sleeves 6 and 6' respectively, in order to enable the independent rotation of the cylinders. An electrically conductive printing rod, such as a metal bar 7, co-extends adjacent the helixes 3 and 4 and parallel to the longitudinal axis of cylinders 1 and 2. An electro-sensitive paper 8 is interposed between the helixes 3 and 4 and the printing bar 7; and means, such as rollers 9 (only one shown), are included for moving the paper at a constant speed in a direction tangent to the peripheral surface of the cylinders. One input conductor 13 is connected directly to the printing bar 7, while a second input conductor 14 is connected to shaft 5 which is in electrically conductive relation with the helixes 3 and 4 through cylinders 1 and 2 respectively.

In order to rotate the larger cylinder 2 at a predetermined greater speed than the speed of rotation of the smaller cylinder 1, I preferably provide a motor 10 which is connected through gear trains 11 and 12 to cylinders 1 and 2 respectively. The gear ratios are adjusted to be such that the longer cylinder 2 is propelled an integral number of revolutions, such as 5 or 10 revolutions, for each revolution of the smaller cylinder 1. It will be appreciated, of course, that although I preferably employ a common drive motor 10 and obtain a proper speed differential by the use of gear trains 11 and 12; separate synchronized motors, one operating at a low speed and the other at a determinably higher speed, may alternatively be directly connected to the small and large cylinders respectively.

In the operation of the invention successive pulses of high voltage whose time interval represents the instantaneous magnitude of a voltage or current to be measured are applied between the helixes 3 and 4 and the printing bar 7 through such means as conductors 13 and 14. Suitable high voltage pulse producing voltage-to-time conversion circuits, such as described in Wilson and Higl Patent 2,434,531 issued January 13, 1948, are well known to the art and are not included herein in order to prevent unnecessary complication of the present disclosure.

The rotation of the smaller cylinder 1 is preferably synchronized to the pulse producing means so that only one spark occurs for each revolution thereof. Since the shaft 5 and the cylinders 1 and 2 are in electrically conductive relation with the helixes 3 and 4 wound thereon, two sparks, one from each helix, occurs for each applied pulse of high voltage. The position of each spark which is produced depends, of course, upon the point along the associated helical conductor which happens to be proximate to the printing bar at the instant the voltage impulse is applied. Since each cylinder is rotating at a constant speed, the position of each helix is continuously changing with time; and the position of each spark is therefore a direct function of the time interval between the sparks. Furthermore, since the speed differential between the two rotating cylinders 1 and 2 is also a constant known value, the position of the spark caused by the slower cylinder is a direct function of the angular position of the faster cylinder with the result that the position of the spark caused by the slower cylinder can easily be calibrated to indicate the number of revolutions which the higher speed cylinder has made during the measured interval.

If, for example, the longer cylinder 2 is rotating at ten times the speed of the smaller cylinder 1 and a spark occurs after the slower moving helix 3 has rotated between $\frac{3}{10}$ and $\frac{4}{10}$ of its length, it is apparent that the faster moving helix 4 is between its third and fourth revolution and that the angular position of this faster moving helix 4 within this latter interval is determinable from the position of the spark produced by the faster moving helix itself.

It will thus be appreciated that the scale or range of the recorder is dependent on the angular velocity of the slower speed cylinder 1 while the sensitivity or accuracy of response is dependent upon the angular velocity of the higher speed cylinder. It is evident that any desired combination of range and sensitivity can easily be obtained by adjusting the speeds of these cylinders accordingly. In addition, it will be appreciated that the cylinders and their associated helixes may be of small physical size since the accuracy of the recorder is primarily dependent upon the speed of the faster moving cylinder 2 rather than upon its physical size.

It is to be understood that, although I have shown a particular embodiment of my invention, many modifications can be made and I intend, therefore, by the appended claims to cover all such modifications as fall within the true spirit and scope of my invention.

What I claim as new and desire to secure by Letters Patent of the United States is:

1. A recording device comprising, a pair of longitudinally spaced cylinders, each of said cylinders having a helical conductor wound on the cylindrical surface thereof, a printing bar extending parallel to the axis and adjacent to the helical conductors of each said cylinders, means for feeding a sheet of electro-sensitive material intermediate said helical conductors and said printing bar, means connected to rotate said cylinders about their respective axes, one of said cylinderse being rotated by said last mentioned means at a predetermined faster angular velocity than the other of said cylinders, and a pair of input conductors, one of said conductors being connected to said printing bar and the other of said conductors being connected to both said helical conductors to enable a high voltage pulse to be impressed between said printing bar and each of said helical conductors thereby to produce two simultaneous sparks through said electro-sensitive material whose locations are dependent upon the relative rotational positions of said helixes upon the occurrence of said high voltage pulse.

2. In a spark recorder, the combination comprising at least two longitudinally spaced helical conductors, a printing bar located adjacent said helical conductors and parallel to the longitudinal axis thereof, said helical conductors being supported for rotation about their longitudinal axis, means for rotating one of said helical conductors at a predetermined faster angular velocity than the other of said helical conductors, and electric conducting means connected to said printing bar and to both said helical conductors for impressing a voltage impulse between said printing bar and each of said rotating helical conductors simultaneously.

3. In a spark recorder the combination comprising, a shaft, a pair of spaced cylinders having equal diameters axially journalled on said shaft, each of said cylinders having a helical conductor wound on the cylindrical surface thereof, a printing bar extending parallel to said shaft adjacent the helical conductors of said cylinders, means connected to rotate one of said cylinders on said shaft at a predetermined angular velocity, means connected to rotate the other of said cylinders on said shaft at an integral multiple of said predetermined angular velocity, and electrical conducting means connected to said printing bar and to both said helical conductors for impressing high voltage pulses between said printing bar and each of said helical conductors simultaneously thereby to cause simultaneous sparks from said printing drum to each of said helical conductors upon the occurrence of a high voltage pulse.

THEODORE A. RICH.

REFERENCES CITED

The following references are of record in the file of this patent:

UNITED STATES PATENTS

| Number | Name | Date |
| --- | --- | --- |
| 1,706,044 | Taylor | Mar. 19, 1929 |
| 2,389,021 | Blain | Nov. 13, 1945 |
| 2,459,521 | Grieg | Jan. 18, 1949 |